United States Patent Office 3,110,705
Patented Nov. 12, 1963

3,110,705

SOLID POLY(3,3,3-TRIFLUOROPROPENE)

Edward M. Sullivan, Charleston, Edgar W. Wise, South Charleston, and Frederick P. Reding, Charleston, W. Va., assignors to Union Carbide Corporation, a corporation of New York No Drawing. Filed Apr. 25, 1961, Ser. No. 105,284
7 Claims. (Cl. 260—92.1)

The present invention is concerned with a process for the free-radical catalyzed polymerization of 3,3,3-trifluoropropene whereby novel, solid, high-molecular weight poly-(3,3,3-trifluoropropene) products are obtained.

It has heretofore been known that halogen-substituted propenes containing a prefluoromethyl group, such as 3,3,3-trifluoropropene, homopolymerize only with difficulty, yielding homopolymeric products which are ordinarily liquid and of relatively low molecular weight. This difficulty was believed due in part to the accumulated steric hindrances resulting from the large diameter of the perfluoromethyl group (see Bernett and Zisman, Journal of Physical Chemistry, vol. 64, 1960, pp. 1292–1294). The homopolymerization was also believed difficult due to the polarization of the monomer engendered by the presence of the strongly electronegative perfluoromethyl group (see Adams and Bovey, Journal of Polymer Science, vol. IX, No. 6, pp. 481–492).

Unexpectedly, it has now been found that 3,3,3-trifluoropropene can be polymerized via controlled polymerization reactions in which both the rate and degree of conversion of the monomer to polymer is enhanced, so as to obtain as products solid, high-molecular weight 3,3,3-trifluoropropene homopolymers. More particularly, the present invention depends upon the finding that solid, high-molecular weight 3,3,3-trifluoropropene homopolymers can be produced by polymerizing 3,3,3-trifluoropropene in contact with a catalytic amount of a free-radical polymerization catalyst at high pressures of at least about 18,000 pounds per square inch. The solid 3,3,3-trifluoropropene homopolymers of this invention are tough, amorphous, rubbery and thermoplastic materials having a high degree of thermal stability and resistance to corrosion, a low coefficient of friction, and can, in turn, be employed to produce articles suitable for industrial application such as laboratory tubing, protective coatings, gaskets, valve seats, pump diaphragms and the like.

Unlike the low-molecular weight, liquid 3,3,3-trifluoropropene homopolymers known to the art, the poly(3,3,3-trifluoropropene) products produced by the process of this invention are solid, high-molecular weight homopolymers having a relative viscosity of at least 1.01, and generally in the range of from about 1.02 to about 1.1 to 1.2 or slightly higher. The term "relative viscosity" is well known in the polymer art and designates the value obtained by dividing the viscosity of a solution of the polymer of the viscosity of the pure solvent as derived, for example, from the following equation:

$$\text{Relative viscosity} = C_s T_s / C_0 T_0$$

wherein $C_s$ is the density of the polymer solution, $C_0$ is the density of the pure solvent, $T_s$ is the efflux time of the polymer solution and $T_0$ is the efflux time of the pure solvent, the efflux time being measured, for example, using an Ubbelohde viscometer. Moreover, in all instances, unless otherwise specifically stated, the relative viscosities described herein and in the appended claims define the values obtained from measurements using as the polymer solution a 0.2 percent by weight solution of the polymer in methyl isobutyl ketone and determined at a temperature of 30° C. Thus obtained, the relative viscosity of the polymer is regarded as a direct measure of the molecular weight of the polymer, with a higher relative viscosity value indicating a higher molecular weight for the polymer.

In an embodiment of the process of this invention, 3,3,3-trifluoropropene and a free-radical polymerization catalyst are brought into intimate contact at a pressure and temperature within the ranges herein prescribed. The polymerization catalysts which are suitable for use in the process of this invention are the conventional free-radical polymerization catalysts commonly employed in addition polymerization reactions. Thus, the term "free-radical catalysts" is used herein to refer to compounds which contain —O—O— or —N=N— structural linkages, or are capable of forming these linkages by the action of dilute inorganic acids, or which otherwise produce free-radicals in situ during the polymerization reaction. As suitable catalysts, one can employ, for example, oxygen; hydrogen peroxide; acyl- or aroyl peroxides such as benzoyl peroxide, acetyl peroxide, lauroyl peroxide, tertiarybutyl hydroperoxide, ditertiarybutyl peroxide, dibenzoyl peroxide, methyl benzoyl peroxide, acetyl benzoyl peroxide, peracetic acid etc.; alkali metal persulfates such as sodium- and potassium persulfates, etc.; alkali metal and ammonium perborates and percarbonates; alkyl percarbonates such as isopropyl percarbonate and butyl percarbonate, etc.; azo compounds such as azobisisobutyronitrile, azobis(2,4-dimethylvaleronitrile), dimethyl azobisisobutyrate, azobisisobutyramide, etc.; trialkylborons such as tributylboron and trioctylboron, etc., and the like.

The concentration of the free-radical polymerization catalyst that is employed in the process of this invention can vary broadly in the range of from about 0.01 mole percent to about 1 mole percent of catalyst based upon the 3,3,3-trifluoropropene monomer, that is to say from about 0.01 mole to about 1 mole of catalyst per 100 moles of monomer, with catalytic amounts below or above this range also being suitable for use. However, little additional advantage if any may accrue from the use of catalyst concentration in excess of this range, while the rate of polymerization may rapidly decrease when lesser catalytic amounts are employed. The preferred catalyst concentration is from about 0.1 mole percent to about 0.5 mole percent of catalyst based upon the monomer.

The pressure employed in the polymerization process of this invention is of prime importance thereto, and should be at least about 18,000 pounds per square inch if the solid, high-molecular weight 3,3,3-trifluoropropene homopolymers of this invention are to be obtained as products. The maximum pressure which can be employed is restricted solely by the limitations imposed by the equipment utilized, and pressures of from about 18,000 pounds per square inch to about 125,000 pounds per square inch, or higher, can readily be employed. The preferred pressure range is from about 25,000 pounds per square inch to about 100,000 pounds per square inch.

The polymerization temperature can vary broadly in the range of from about −80° C., or slightly lower, to about +100° C., or slightly higher, with temperatures of from about −10° C. to about +70° C. being preferred. A balance of pressure and temperature must be achieved to prevent decomposition, as is well known in the art among those skilled in high pressure polymerization reaction, with especially good results being realizable using higher pressures in conjunction with lower temperatures within the aforementioned ranges. As also recognized by those skilled in the art of polymerization reaction, the temperature to be employed may also depend in part upon the particular polymerization catalyst used. Thus, for instance, somewhat lower polymerization temperatures of from about −10° C. to about 30° C. are more preferably employed in conjunction with the use of trialkylboron catalysts as compared with the more preferred use of polymerization temperatures of from about 30° C. to about 70° C. in conjunction with the use of peroxidic catalysts.

The polymerization process of this invention can be carried out continuously in a tubular reactor, semicontinuously or batchwise, with or without a diluent such as toluene, benzene, heptane etc. In any event, vigorous agitation and good cooling should be employed, particularly in bulk or large scale operations, so as to provide for the rapid removal of the heat of polymerization. Upon carrying out the polymerization for a period of time sufficient to produce a solid homopolymeric product, which period can vary from as little as about 1 hour or less, up to three or more days, if desired, the resulting polymer can be recovered by any convenient and suitable means such as by precipitation, filtration, evaporation, etc.

The following examples further serve to define and illustrate the invention, and are not to be construed as limitative thereof. In the examples, the term "glass-transition" temperature, were employed, is meant to define the softening point of the polymer, i.e., the temperature at which the polymer goes from a rigid material to a soft, flexible material and was determined by measuring the stiffness modulus of the polymer as a function of temperature in the following manner. Small strips of the polymer measuring about one-eighth inch wide and about 0.01 to 0.02 inch thick were stretched in an Instron tester at a rate of 10 percent of the strip length per minute to a total extension of 1 percent. The stiffness modulus was taken as 100 times the force in pounds per square inch required to stretch the polymer strip 1 percent. Stiffness modulus values were measured at a series of temperatures generally varying in increments of about 10° C. and the values then plotted graphically against the temperatures at which the values were obtained. The first sharp drop in the stiffness modulus with increasing temperature is associated with the glass-transition temperature of the polymer, the latter being taken as approximately the middle point of the first sharp drop in the stiffness modulus as graphically represented.

*Example I*

A 10-milliliter steel alloy reactor was charged under a nitrogen atmosphere with 0.05 gram of azobisisobutyronitrile and filled with approximately 10 milliliters of cold 3,3,3-trifluoropropene at a temperature of −30° C. The charge was compressed to 50,000 pounds per square inch and maintained at this pressure by the injection of additional 3,3,3-trifluoropropene, and at a temperature of between 59° C. and 60° C., for a period of 12⅓ hours. Conducted in this manner, the ensuing polymerization reaction produced 5.68 grams of a solid homopolymer of 3,3,3-trifluoropropene. Physical studies showed the homopolymeric product to be an amorphous, elastomeric resin having a relative viscosity of 1.05 and a glass transition temperature of 35° C.

*Example II*

To the reactor and in the manner described in Example I, there were charged 0.05 gram of azobisisobutyronitrile and 10 milliliters of cold 3,3,3-trifluoropropene at a temperature of −30° C. The charge was compressed to 67,200 pounds per square inch and maintained at a pressure of between 64,800 and 69,000 pounds per square inch by the injection of additional 3,3,3-trifluoropropene, and at a temperature of between 56° C. and 60° C., for a period of 9½ hours. The polymerization reaction produced 2.78 grams of a solid homopolymer of 3,3,3-trifluoropropene having a relative viscosity of 1.09.

A 0.2-gram sample of the polymer was molded at a temperature of 65° C. and at a pressure of 1000 pounds per square inch using a Buehler hydraulic press to produce a transparent, non-flammable flexible plaque having a thickness of approximately 8.5 mils.

*Example III*

To the reactor and in the manner described in Example I, there were charged 0.2 milliliter of a 50 percent by weight solution of tributylboron in isooctane and 10 milliliters of cold 3,3,3-trifluoropropene at a temperature of −10° C. The charge was compressed to 72,000 pounds per square inch and maintained at a pressure of between 72,000 and 78,000 pounds per square inch by the injection of additional 3,3,3-trifluoropropene, and at a temperature of between −5° C. and 4° C., for a period of 8¾ hours. The polymerization reaction produced 0.324 gram of a solid homopolymer of 3,3,3-trifluoropropene having a relative viscosity of 1.05.

*Example IV*

To the reactor and in the manner described in Example I, there were charged 0.05 gram of azobisisobutyronitrile and 10 milliliters of cold 3,3,3-trifluoropropene at a temperature of −30° C. The charge was compressed to 18,000 pounds per square inch and maintained at a pressure of between 18,000 and 21,600 pounds per square inch by the injection of additional 3,3,3-trifluoropropene, and at a temperature of between 60° C. and 61° C., for a period of 14 hours. The polymerization reaction produced 0.321 gram of a solid homopolymer of 3,3,3-trifluoropropene having a relative viscosity of 1.01.

*Example V*

To the reactor and in the manner described in Example I, there were charged 0.2 milliliter of a 50 percent by weight solution of tributylboron in isooctane and 10 milliliters of cold 3,3,3-trifluoropropene at a temperature of −10° C. The charge was compressed to 52,200 pounds per square inch and maintained at a pressure of between 52,200 and 55,200 pounds per square inch by the injection of additional 3,3,3-trifluoropropene, and at a temperature of between −74° C. and −79° C., for a period of 18 hours. The polymerization reaction produced 0.607 gram of a solid homopolymer of 3,3,3-trifluoropropene having a relative viscosity of 1.03.

*Example VI*

To the reactor and in the manner described in Example I, there were charged 0.2 milliliter of a 25 percent by weight solution of acetyl peroxide in dimethyl phthalate and 10 milliliters of cold 3,3,3-trifluoropropene at a temperature of −30° C. The charge was compressed to 75,600 pounds per square inch and maintained at a pressure of between 75,600 and 79,200 pounds per square inch by the injection of additional 3,3,3-trifluoropropene, and at a temperature of between 40° C. and 41° C., for a period of 14 hours. The polymerization reaction produced 0.139 gram of a solid homopolymer of 3,3,3-trifluoropropene having a relative viscosity of 1.09.

What is claimed is:

1. Solid homopolymers of 3,3,3-trifluoropropene having a relative viscosity in the range of from about 1.01 to about 1.2.

2. Solid homopolymers of 3,3,3-trifluoropropene having a relative viscosity in the range of from about 1.02 to about 1.1.

3. A process for the production of solid homopolymers of 3,3,3-trifluoropropene which comprises contacting 3,3,3-trifluoropropene with a catalytic amount of free-radical polymerization catalyst at a pressure of from about 18,000 pounds per square inch to about 125,000 pounds per square inch and at a temperature of from about −80° C. to about +100° C.

4. A process for the production of solid homopolymers of 3,3,3-trifluoropropene which comprises contacting 3,3,3-trifluoropropene with a catalytic amount of free-radical polymerization catalyst at a pressure of from about 25,000 pounds per square inch to about 100,000 pounds per square inch and at a temperature of from about −10° C. to about +70° C.

5. The process according to claim 4 wherein the catalyst is azobisbutyronitrile.

6. The process according to claim 4 wherein the catalyst is tributylboron.

7. The process according to claim 4 wherein the catalyst is acetyl peroxide.

References Cited in the file of this patent

UNITED STATES PATENTS

| | | |
|---|---|---|
| 2,484,530 | Schroeder | Oct. 11, 1949 |
| 2,549,580 | Denison et al. | Apr. 17, 1951 |
| 2,626,252 | Tawney | Jan. 20, 1953 |
| 2,787,646 | Haszeldine | Apr. 2, 1957 |
| 2,842,528 | Herbst et al. | July 8, 1958 |
| 2,842,529 | Bolstad | July 8, 1958 |
| 2,888,446 | Herbst et al. | May 26, 1959 |
| 2,958,685 | Eleuterio | Nov. 1, 1960 |